INVENTOR.
GAYLORD W. BROWN

INVENTOR.
GAYLORD W. BROWN
BY Learman & McCulloch

United States Patent Office 3,669,606
Patented June 13, 1972

3,669,606
APPARATUS FOR FORMING PROTRUSIONS WITH ENLARGED HEAD PORTIONS IN THERMOPLASTIC SHEET MATERIAL
Gaylord W. Brown, Beaverton, Mich., assignor to Koehring Company, Milwaukee, Wis.
Filed Feb. 20, 1969, Ser. No. 800,844
Int. Cl. B29c 17/03
U.S. Cl. 425—398                                  20 Claims

ABSTRACT OF THE DISCLOSURE

Methods and apparatus for forming protrusions with enlarged heads in thermoplastic synthetic plastic sheets wherein a male part on one die enters a female part on another die having a stretchable, resilient, bell-shaped liner with a reciprocable bottoming pin therein which is pushed inwardly by the male die part to distort the liner so that the outer portions of the side wall of the liner are collapsed inwardly and form the reduced neck on the protrusion formed in the plastic web by the male and female parts. The side wall of the liner is shaped to form a button-shaped head in the plastic web when the pressure of the descending male die on the sheet assists in moving outer portions of the side wall of the liner inwardly to form the reduced neck. The protrusions formed are particularly useful as fasteners for egg cartons and are formed in conventional differential pressure thermoforming machines as a part of the overall operation of forming the egg carton itself.

---

One of the prime objects of the invention is to provide methods and apparatus for forming protrusions in egg cartons during the thermoforming of the egg cartons so that the separate halves of the egg cartons may be simply folded over after mating openings are punched, with the result that the protrusions enter the openings and hold the egg carton halves in closed relation once eggs are inserted in the carton.

A further object of the invention is to provide an egg carton incorporating the protrusions described wherein the openings for receiving the releasable protrusions may be punched in the egg carton in proper position at the same time the egg carton is being trimmed from the plastic sheet or web in which it is formed.

Still another object of the invention is to provide an egg carton of the character mentioned with releasable locking protrusions which may be formed of various plastic sheet materials, including plastic foam sheets.

Other objects and advantages of the invention will be pointed out specifically or will become apparent from the following description when it is considered in conjunction with the appended claims and the accompanying drawings, in which:

Figure 1:
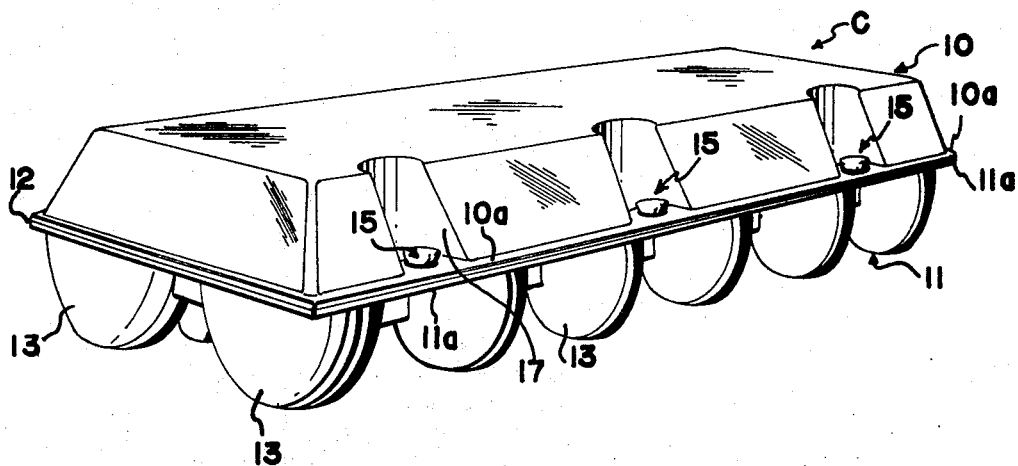
FIG. 1 is a perspective elevational view of an egg carton formed according to the invention, and showing the top half folded down and releasably secured by the protrusions formed in the bottom half.
Figure 2:
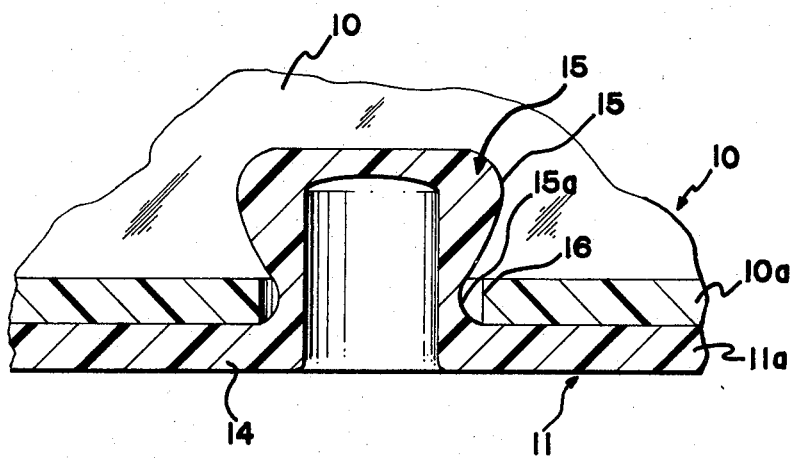
FIG. 2 is a greatly enlarged, fragmentary, sectional side elevational view illustrating the manner in which one of the locking protrusions is received by the opening in the cover of the egg carton.

Referring now more particularly to the accompanying drawings and in the first instance to FIGS. 1 and 2, wherein a completed egg carton is illustrated, a letter C generally indicates the egg carton which, as usual, includes a dish-shaped cover portion generally designated 10 and an egg pocket containing bottom portion generally designated 11. The parts 10 and 11 are joined by a connecting web portion 12 and each of the cover and bottom portions 10 and 11, respectively, are provided with flanges or lips 10a and 11a, respectively. Egg holding pockets 13 are spaced in two rows along the length of the carton or container C so that a dozen eggs may be accommodated in the carton in the usual manner.

Figure 3:
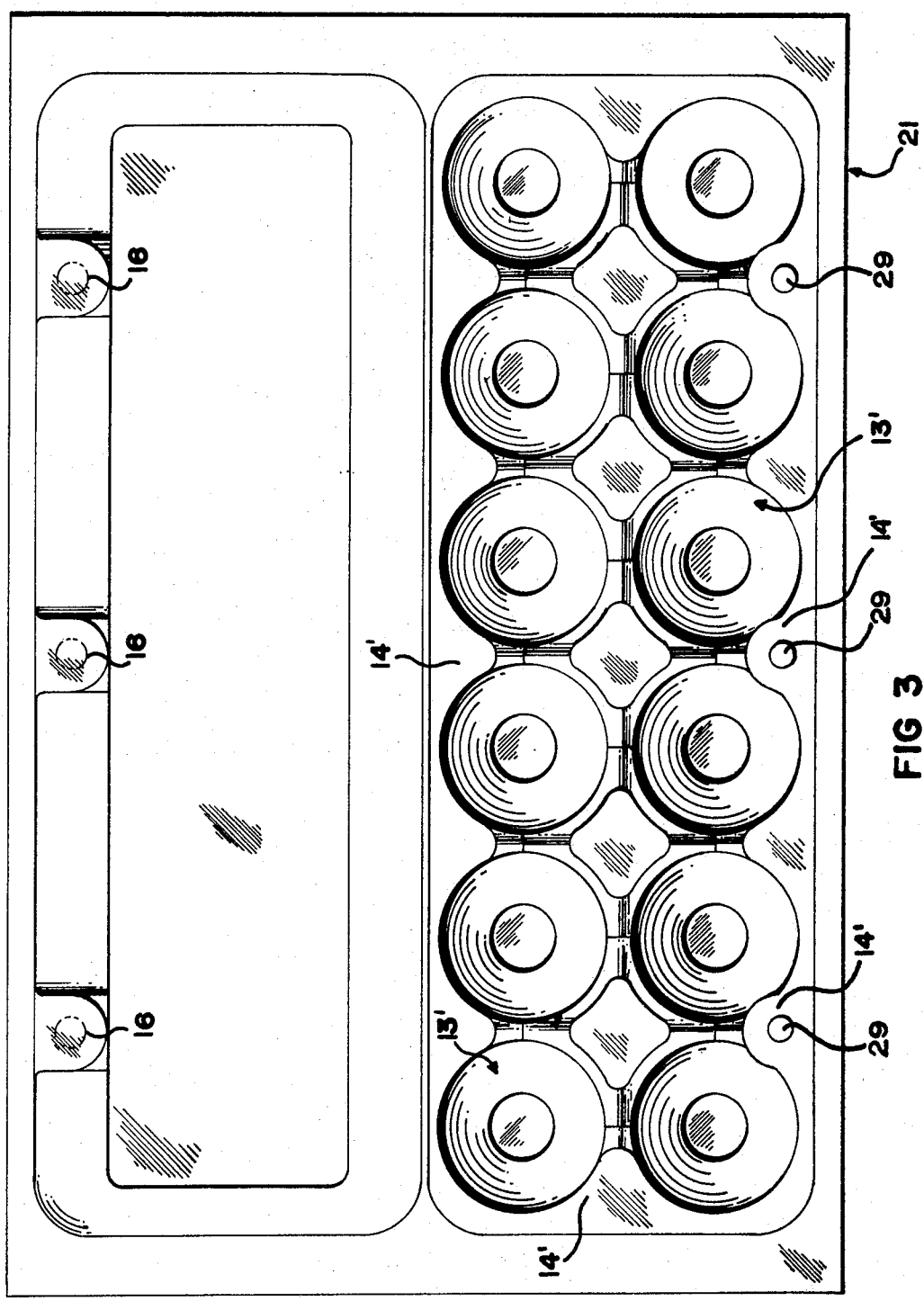
FIG. 3 is a top plan view illustrating a female mold which is used to form the egg carton, the diagrammatic lines showing the location of the openings which could be later punched in an egg carton formed in the mold.

The pockets 13′ provided in the female die for forming the egg holding pockets 13 are shown particularly in FIG. 3 and, as FIG. 3 also indicates, the flange portions 14 which extend somewhat between the pockets 13 are formed by the portions 14′ of the female die. It is in these portions 14 that hollow, resilient, button or rivet-shaped locking protrusions generally designated 15 (see FIGS. 1 and 2) are formed. Opposite the protrusions 15 in the cover 10 of the carton are mating openings 16 which are punched in the carton at the same time the carton is being trimmed or cut out from the plastic web in which it is formed in conventionl trim press machinery. The openings 16 are formed in the enlarged flange portions created by indenting the cover 10 of the egg carton C as at 17.

Figure 4:
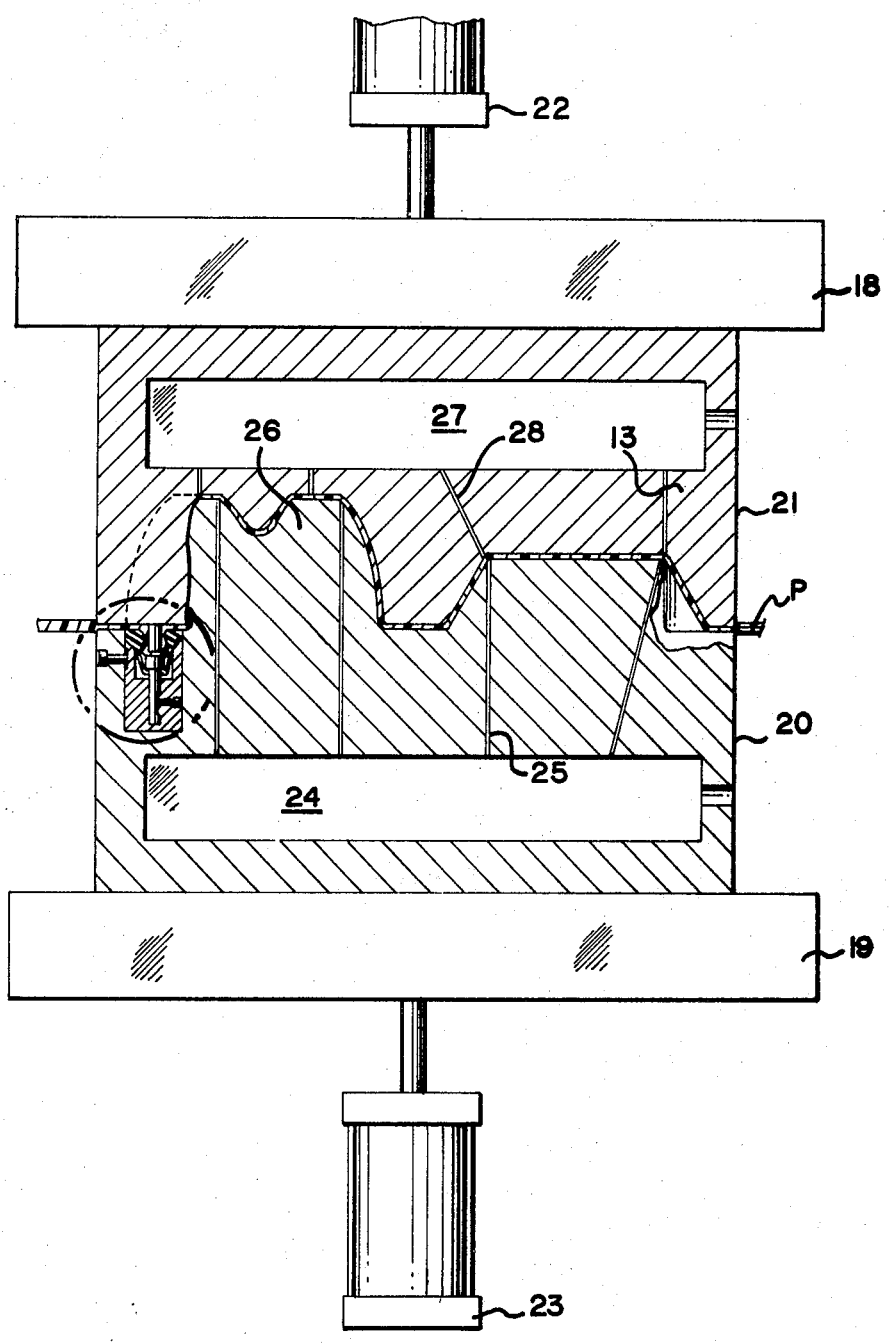
FIG. 4 is a transverse sectional view showing the male and female molds in closed position.

As FIG. 4 indicates, upper and lower platens 18 and 19, respectively, are provided in the usual manner and move the upper die 20 and lower die 21 toward and away from one another in the usual manner. A pressure fluid operated cylinder 22 may be provided to move the upper platen 18, and a pressure fluid operated cylinder 23 may be provided to move the lower platen 21. The lower mold 20 may be provided with a forming air manifold 24 having ports 25 leading to the egg pocket forming assists or plugs 26 and connected with a suitable source of air under pressure in the usual manner. The female mold 21 is provided with a forming air manifold 27 having ports 28 leading to the egg forming pockets 13, the manifold 27 being connected with a suitable source of suction such as a suction pump, in the usual manner. Clearly, the molds shown could be utilized in the differential pressure forming machine shown in United States Pat. No. 3,346,923, issued Oct. 17, 1967, to Gaylord W. Brown and Donald J. Rise.

Figure 5:
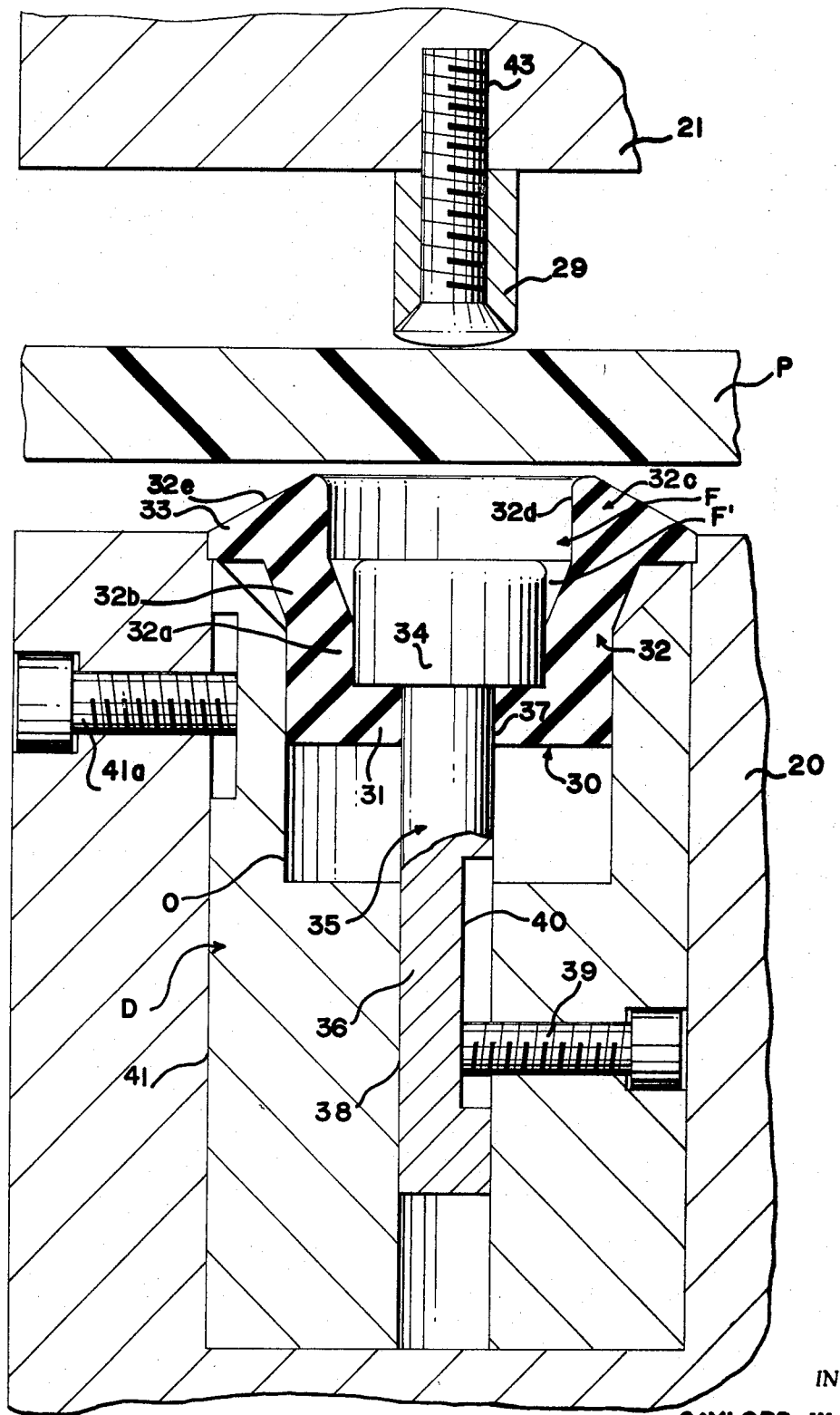
FIG. 5 is a greatly enlarged, sectional side elevational view of the portion of the mold circled in FIG. 4, the mold parts being shown in separated position.
Figure 6:
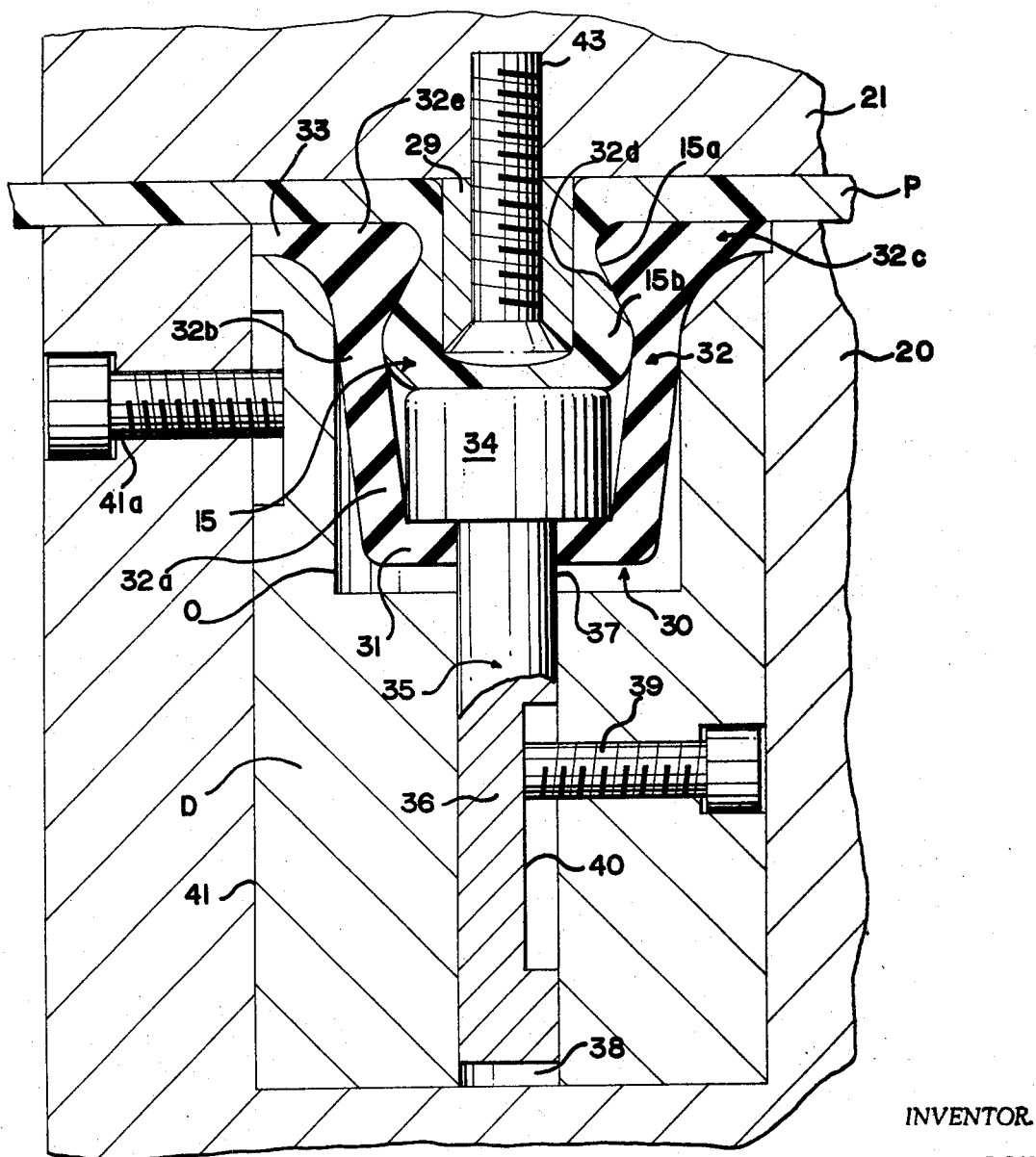
FIG. 6 is a similar view with the mold parts shown in closed position.

Provided in the portions 14′ of the female mold 21 at intervals, as shown in FIG. 3, are the forming projections 29 which are utilized in the forming of the locking protrusions 15. The female die cavities generally designated F are oppositely formed in the die 20 and are of the character shown in FIGS. 3–6. FIGS. 5 and 6 are enlarged views which particularly illustrate the manner in which the locking protrusions 15 are formed, and it will be observed that the upper portion of the cavity F is enlarged and diverges as at F′. Provided in an opening O formed concentrically in a die D opposite each projection 29 to form each cavity F, is a generally bell-shaped rubber liner generally designated 30 which is preferably formed of a heat resistant, synthetic rubber material which will withstand the forming temperatures without deterioration. Each liner 30 which typically may have a durometer rating of 50 includes a bottom wall 31 and a side wall generally designated 32 which is formed with a laterally extending flange portion 33. The side wall 32 includes an axially extending circular wall portion 32a, an outwardly flaring portion 32b forming the portion F' of the die cavity F, and an upper portion generally designated 32c having an axially extending circular wall 32d and a downwardly sloping upper wall 32e. The bottom wall 31 and portion 32a of the side wall define a seat for the head 34 of a bottoming pin generally designated 35 which also includes a shank 36 which extends downwardly through an opening 37 in the bottom wall 31 of the liner 30 into a bore 38 in the die D. A bolt member 39 provided in the female die part D extends into a keyway or slot 40 provided in the pin shank 36 and functions to prevent turning movement of the pin 35 without restricting its vertical reciprocating movement. The female die part D is locked in vertically adjusted position in its receiving opening 41 by a set screw 41a.

Provided, as noted, on the upper mold 21 in vertical alignment with each female die part D is a male die part 29 which is secured in position by a screw member 43 and is received within the liner 30 when the male and female molds 20 and 21 are brought together in the manner shown in FIG. 6.

THE OPERATION

When the heated and deformable synthetic plastic web P is forced downwardly by the male part 29, the thermoplastic sheet P is initially stuffed into the opening defined by liner walls 32d by the male part 29, and the upper portions 32c are only collapsed inwardly after the plastic material P engages the head 34 of pin 35 and forces it downwardly to stretch and collapse the side wall 32 of the liner around the plastic protrusion which is formed in the web P. Once the collapsing action has triggered collapse of the outer portions 32c of the rubber liner side wall 32, further downward pressure on the portions 32c exerted by the web P will tend to move portions 32c inwardly, as shown in FIG. 6, to squeeze in the plastic and form the reduced neck portion 15a inwardly of the enlarged head 15b which is formed.

A comparison of FIGS. 5 and 6 will indicate the extent to which the liner 30 is stretched or distorted by the closing pressure of the molds. The normal position of the bottom wall 31 of liner 30 is shown in FIG. 5, and the most extremely distorted position of the side wall 32 is indicated in FIG. 6. As FIG. 6 indicates, the distortion is such that the normally inclined portion 32b is stretched and aligns with the portion 32a. When the male and female molds 20 and 21 are separated, it is the female mold 21 which is first moved upwardly to remove the cylindrical male parts 29. Once the projections 29 are removed, the rubber liners 32 force the pins 35 upwardly and the upper or outer portions of the liner are then free to return to the position shown in FIG. 5 so that they do not interfere with withdrawal of the lower die member 20 from the plastic web P.

The carton is formed in the manner indicated in FIG. 4 with the cover and bottom in side-by-side relationship and is then trimmed from the plastic web P in the usual manner. At the time of trimming, as previously noted, punches are employed to punch the openings 16 for receiving the plastic protrusions 15, and no separate operation is necessary.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. Apparatus for forming a protuberance with a reduced neck in a deformable thermoplastic synthetic plastic sheet comprising:
    female mold means having a cavity therein;
    opposed male mold means for inserting a portion of said plastic sheet into said cavity to form said protuberance;
    means for supporting said deformable synthetic plastic sheet between said mold means;
    means mounting said male and female mold means for relative movement to substantially engaged and remote positions; and
    a resilient bell-shaped liner member mounted in said cavity and having an opening at an axially outer end for receiving said plastic sheet; said bell-shaped member having an axially outer portion displaceable radially inwardly for reducing said opening to form said reduced neck in response to relative movement of said molds toward said substantially engaged position.

2. Apparatus for forming a protuberance with a reduced neck in a thermoplastic synthetic plastic sheet comprising:
    female mold means having a cavity therein;
    opposed male mold means for inserting a portion of said plastic sheet into said cavity to form said protuberance;
    means for supporting said deformable synthetic plastic sheet between said mold means; and
    resilient liner means of generally U-shaped lengthwise cross-section mounted in said cavity for stretching movement and having displaceable means displaceable radially inwardly in said cavity to form a reduced neck on the protuberance formed in said plastic sheet in response to said male mold means moving the sheet portion into the cavity.

3. Apparatus for forming a protuberance with a reduced neck in a thermoplastic synthetic plastic sheet comprising:
    female mold means having a cavity therein;
    opposed male mold means for inserting a portion of said plastic sheet into said cavity to form said protuberance;
    means for supporting said deformable synthetic plastic sheet between said mold means; and
    resilient bell-shaped liner means mounted in said cavity for stretching movement and being distortable radially inwardly in said cavity to form a reduced neck on the protuberance formed in said plastic sheet in response to said male mold means moving the sheet portion into the cavity, said resilient means including an axially inner end wall and laterally projecting means on the axially outer portion of said resilient means for engaging said female mold means adjacent the open end of said cavity for normally resiliently supporting the axially inner end wall of said resilient means in spaced relation with the end wall of said cavity, but permitting the expansion of said axially inner end wall toward the end wall of said cavity when the male mold means moves the sheet portion into the cavity.

4. Apparatus for forming a protuberance with a reduced neck in a thermoplastic sheet of synthetic plastic comprising:
    bell-shaped, resilient liner means forming said protuberance, and having an opening at an axially outer end for receiving a portion of said plastic sheet said bell-shaped means having deformable side wall means stretchable to vary the size of said opening; and
    means for stretching said side wall means for reducing the size of said opening to form said reduced neck.

5. Apparatus for forming a protuberance with a reduced neck in a thermoplastic synthetic plastic sheet comprising:
    female mold means having a cavity therein;
    means supporting a deformable synthetic plastic sheet adjacent said mold means;
    resilient liner means mounted in said cavity for receiving a portion of said plastic sheet to form said protuberance and including displaceable means displaceable radially inwardly in said cavity to form a reduced neck on the protuberance; and means for displacing said displaceable means radially inwardly to displace a portion of said sheet and form said reduced neck while simultaneously axially stretching said resilient means to diminish the radial thickness of a portion of said resilient means and provide an enlarged space for receiving the displaced sheet portion to form said protuberance.

6. Apparatus for forming a protuberance with a reduced neck in a thermoplastic synthetic plastic sheet comprising:

mold means defining a cavity and including resilient liner means disposed in said cavity and having an opening at an axially outer end of said cavity for receiving a portion of said plastic sheet; and means for stretching said resilient means to diminish the radial thickness of a portion of said resilient means axially inwardly of the opening and provide an enlarged space in which said protuberance is formed and for simultaneously deforming the axially outer portion of said resilient means radially inwardly to form said reduced neck.

7. In combination with differential pressure forming apparatus for forming containers, such as egg cartons and the like, having connected portions relatively foldable between remote positions, in which the container is open, and confronting positions, in which the portions cooperate to form a closed container; a frame, a pair of opposing mold members supported thereby, at least one of which is mounted to be moved relatively toward the other to an extended position adjacent a deformable plastic sheet positioned therebetween, one of said molds having cavity means to receive the plastic sheet therein; means for creating a differential pressure on opposite sides of said plastic sheet to draw the sheet into intimate contact with said cavity means to form said containers; means for forming a locking protrusion with a reduced neck on at least one of said connected container portions comprising:

a cavity in at least one of said mold members;

male mold means on the other of said mold members for inserting a portion of said plastic sheet into said cavity to form said protrusion; and resilient liner means of generally U-shaped lengthwise cross-section mounted in said cavity for stretching movement and including displaceable means displaceable radially inwardly in said cavity to form a reduced neck on the protrusion formed in said plastic sheet in response to said male mold means moving the sheet portion into the cavity.

8. In combination with a differential pressure forming apparatus for forming containers such as egg cartons and the like, having connected portions relatively foldable between remote positions, in which the container is open, and confronting positions, in which the portions cooperate to form a closed container; a frame; a pair of opposing mold members supported thereby, at least one of which is mounted to be moved relatively toward the other to an extended position adjacent a deformable plastic sheet positioned therebetween, one of said molds having cavity means to receive the plastic sheet therein; means for creating a differential pressure on opposite sides of said plastic sheet to draw the sheet into intimate contact with said cavity means to form said connected portions; and means for forming a locking protrusion with a reduced neck on at least one of said connected portions comprising:

a cavity in one of said mold members;

resilient liner means mounted in said cavity and having an opening at an axially outer end for receiving said plastic sheet to form said protrusion; and means for stretching said resilient means to diminish the radial thickness of a portion of said resilient means axially inwardly of said opening and provide an enlarged space in which said protuberance is formed and to simultaneously deform the axially outer portion of said resilient means radially inwardly to form said reduced neck.

9. Apparatus for forming a protuberance with a reduced neck in a thermoplastic sheet of synthetic plastic comprising:

a generally tubular mold member for receiving a portion of said plastic sheet and forming said protuberance;

said tubular mold member having a mouth portion swingable radially inwardly relatively to the remainder of said mold member from a remote position to an operative position to form said reduced neck;

said tubular member being biased to said remote position; and means for swinging said mouth radially inwardly to form said reduced neck and permit said mouth portion to return to said remote position after said reduced neck is formed.

10. Apparatus for forming a protuberance with a reduced neck in a thermoplastic sheet of synthetic plastic comprising:

female mold means of generally U-shaped lengthwise cross-section for receiving a portion of said plastic sheet and forming said protuberance;

said female mold means having a radially inwardly displaceable mouth portion for forming said reduced neck; and means for displacing said mouth portion radially inwardly to form said reduced neck.

11. Apparatus as set forth in claim 1 wherein said bell-shaped liner member includes a bell-shaped cup having said opening at said axially outer end for receiving said plastic sheet;

said bell-shaped cup including said displaceable portion displaceable radially for reducing said opening to form said reduced neck in response to axial stretching of said cup.

12. Apparatus as set forth in claim 11 wherein said displaceable portion projects from said female mold means and is further displaceable radially inwardly in response to substantial engagement of said mold means to press the axially outer portion of said bell shaped cup axially inwardly.

13. Apparatus as set forth in claim 11 wherein said bell-shaped cup includes radially outwardly extending flange means on the axially outer portion thereof adjacent said displaceable portion for engaging said female mold means adjacent the open end of said cavity, and axially inner end wall means; and displaceable cup stretch means supported in said bell-shaped cup.

14. Apparatus as set forth in claim 13 wherein said cup stretch means includes means moving said axially inner end wall means of said bell shaped liner means toward the end wall of said cavity.

15. Apparatus as set forth in claim 14 wherein said means moving said axially inner wall includes means responsive to insertion of said plastic sheet in said female mold means by said male mold means.

16. Apparatus as set forth in claim 14 wherein said means moving said axially inner end wall means of said resilient means includes a bottoming pin slidably mounted in said female mold means and extending through the axially inner wall of said resilient means; and an enlarged head attached to said pin for engaging said axially inner end wall means of said resilient means.

17. Apparatus as set forth in claim 2 wherein said resilient means comprises bell-shaped means having an opening at an axially outer end for receiving said plastic sheet and deformable side wall means responsive to stretching of said resilient means for varying the size of said opening.

18. Apparatus as set forth in claim 4 wherein said bell-shaped means further includes an axially inner end wall oppositely disposed from said opening; said means for stretching including means for engaging said end wall.

19. Apparatus as set forth in claim 18 wherein said means for engaging the end wall includes pin means extending through said end wall; said pin means including an enlarged head for engaging the end wall of said stretchable means.

20. Apparatus as set forth in claim 19 wherein said means for stretching includes male mold means for inserting said plastic sheet into the opening formed by said bell-shaped stretchable means and for moving said pin means.

References Cited

UNITED STATES PATENTS

| | | | |
|---|---|---|---|
| 3,079,633 | 3/1963 | Fitz | 18—5 M |
| 3,160,920 | 12/1964 | Busch | 18—35 |
| 1,534,698 | 4/1925 | Gansert et al. | 113—121 |
| 2,132,002 | 10/1938 | Hight | 18—19 P |
| 2,582,922 | 1/1952 | Crowley et al. | 18—16 RX |
| 3,488,802 | 1/1970 | Passarelli | 18—19 PX |

ROBERT L. SPICER, Jr., Primary Examiner

U.S. Cl. X.R.

425—346